(12) United States Patent
Shimanuki et al.

(10) Patent No.: US 7,710,980 B2
(45) Date of Patent: *May 4, 2010

(54) SYNCHRONIZATION SYSTEM AND METHOD

(75) Inventors: Tomoharu Shimanuki, Tokyo (JP); Ken Shiraishi, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 248 days.

This patent is subject to a terminal disclaimer.

(21) Appl. No.: 11/842,122

(22) Filed: Aug. 20, 2007

(65) Prior Publication Data

US 2008/0043753 A1 Feb. 21, 2008

Related U.S. Application Data

(63) Continuation of application No. 11/379,915, filed on Apr. 24, 2006, now Pat. No. 7,613,194, which is a continuation of application No. 11/071,578, filed on Mar. 4, 2005, now Pat. No. 7,061,922, which is a continuation of application No. 09/858,637, filed on May 17, 2001, now Pat. No. 6,882,650.

(30) Foreign Application Priority Data

May 17, 2000  (JP) .............................. 2000-144239

(51) Int. Cl.
*H04L 12/28* (2006.01)

(52) U.S. Cl. .................................... 370/395.6; 370/474

(58) Field of Classification Search ................ 370/216, 370/217, 218, 219, 220, 221, 395.1, 395.6, 370/465, 466, 469, 473, 474, 503
See application file for complete search history.

(56) References Cited

U.S. PATENT DOCUMENTS

| 5,428,609 | A | | 6/1995 | Eng et al. |
| 5,541,926 | A | * | 7/1996 | Saito et al. .................. 370/474 |
| 5,742,600 | A | | 4/1998 | Nishihara |
| 5,920,563 | A | | 7/1999 | Fukui et al. |
| 6,418,144 | B1 | | 7/2002 | Saeki |
| 6,882,650 | B2 | * | 4/2005 | Shimanuki et al. ........ 370/395.6 |
| 7,061,922 | B2 | * | 6/2006 | Shimanuki et al. ........ 370/395.6 |
| 2006/0193326 | A1 | * | 8/2006 | Shimanuki et al. ........ 370/395.6 |

FOREIGN PATENT DOCUMENTS

| JP | 9-55752 | 2/1997 |
| JP | 2001-320379 | 11/2001 |

* cited by examiner

*Primary Examiner*—Ricky Ngo
*Assistant Examiner*—Christine Ng
(74) *Attorney, Agent, or Firm*—Harrity & Harrity, LLP

(57) ABSTRACT

Upon receipt of a synchronization request from the CPU, the AAL1 device of the act system causes its cell forming section to extract the allocation position information for the SAR-PDU payload about a particular time slot in the current frame and, via the synchronization information send/receive section, transfers the information to the AAL1 device of the standby system. The AAL1 device of the standby system causes its operation processing section to calculate the allocation position of a particular time slot in the next frame for the SAR-PDU payload based on the above allocation position information. The AAL1 device of the standby system starts allocation of the data of and following a particular time slot of the next frame to the SAR-PDU payload starting from the position indicated by the calculation result.

20 Claims, 15 Drawing Sheets

SAR SUBLAYER FORMAT

SAR-PDU HEADER FORMAT

NON-P FORMAT

P FORMAT

ALLOCATION TO ATM CELL WHEN ONE FRAME OF STM DATA HAS 470 TIME SLOTS
(DATA FOR TEN SAR-PDU PAYLOADS)

SYNCHRONIZATION SYSTEM AND METHOD

RELATED APPLICATION

This application is a continuation of U.S. patent application Ser. No. 11/379,915, filed Apr. 24, 2006, which is a continuation of U.S. patent application Ser. No. 11/071,578 filed Mar. 4, 2005, which is a continuation of U.S. patent application Ser. No. 09/858,637, filed May 17, 2001, now U.S. Pat. No. 6,882,650 which are all incorporated herein by reference.

BACKGROUNDS OF THE INVENTION

1. Field of the Invention

The present invention relates to a dual AAL1 device and a synchronization method used therewith and particularly relates to a synchronization method for the operation status between the act system and the standby system when an AAL1 (ATM Adaptation Layer Type 1) device to convert the STM (Synchronous Transfer Mode) data into ATM (Asynchronous Transfer Mode) cells has a dual configuration consisting of an act system (Current operation system) and a standby system (Reserved system).

2. Description of the Related Art

Conventionally, the STM data input to an AAL1 device to convert the STM data into ATM cells has the structure as shown in FIG. 10. As shown in FIG. 10, the STM data is given by time division multiplexing, where the channel is identified by the time position in the frame, and transferred for each time slot (TS; 1 TS=1 octet).

Further, an ATM cell converted by the above AAL1 device has the structure as shown in FIGS. 11 to 14. FIG. 11 shows a format of the SAR (Segmentation and Reassembly) sublayer. The ATM cell payload of 48 octets as a whole represents an SAR-PDU (SAR Protocol Data Unit). The first octet of the SAR-PDU is allocated to the SAR-PDU header and the remaining 47 octets are the SAR-PDU payload.

FIG. 12 shows a format of the SAR-PDU header and FIG. 13 shows a non-P format and FIG. 14 shows a P format. In FIG. 12, the first 4 bits of the SAR-PDU header are called "SN" (Sequence Number) and the latter 4 bits are called "SNP" (Sequence Number Protection).

The bits of the SAR-PDU header are used as follows: CSI (Convergence Sublayer Indication) is the bit used by the CS (Convergence Sublayer) and the utilization method differs for each CS.

The SC (Sequence Count) is the number indicating the order of the cell (which ranges from 0 to 7) and is given by the CS. The CRC (Cyclic Redundancy Check=Error correction detection code) and the P (Parity) are inspection bits for error control of the SAR-PDU header. By combining the CRC and the P, any error in the SAR-PDU header can be corrected or detected.

The structure of the ATM cell as shown in FIGS. 11 to 14 is designed so that it can support transfer of the STM signal frame structure to the receiver when required and the protocol for the structured data transfer is specified. In this case, as shown in FIG. 14, a pointer (which ranges from 0 to 93) is inserted to the cell to clearly indicate the first time slot of the STM data frame.

The pointer is inserted to the beginning of the SAR-PDU payload. The cells to which the pointer can be inserted are limited to those with even SC. The pointer is inserted once for one cycle of SC (0 to 7) and causes the CSI bit to be "1". The cell structure to which the pointer is thus inserted is called the P format and, as shown in FIG. 13, the cell structure to which the pointer is not inserted is called the non-P format. In addition, the case without using the protocol for the structured data transfer is called the UDT (Unstructured Data Transfer) and the case using the structured data transfer protocol is called the SDT (Structured Data Transfer).

The functional blocks in an ATM switch for the ATM network have dual redundant configurations to assure a high reliability with confounding among the functional blocks. A dual-structure functional block uses one set of equipment as the act system and the other set of equipment as the standby system. It may be sometimes necessary to switch between the equipment serving as the act system and the equipment serving as the standby system for maintenance requirement.

If the timing to form ATM cells is not synchronized in the AAL1 device with the dual configuration, there will be phase differences between the payload of the cells output from the AAL1 device of the act system and that of the cells output from the AAL1 device of the standby system as shown in FIG. 15. This may result in lack or redundancy of data in system switching processing.

Japanese Patent Application Laid-open Print (Kokai) No. Heisei 9-55752 discloses a synchronization method for a dual AAL1 device to enable switching between the equipment serving as the act system and the equipment serving as the standby system without causing any lack or redundancy of information or other momentary shutdown.

The dual AAL1 device as described in the above patent application comprises inter-system signal lines connecting the act system AAL1 device and the standby system AAL1 device as well as a cell assembly buffer for one or more unit of channels provided for each system.

For synchronization, the cell assembly buffer number to execute synchronization is notified from the act system AAL1 device to the standby system AAL1 device by each unit of cell assembly buffer via the intersystem signal line at the timing when the storage data in the cell assembly buffer is the final octet of the SAR-PDU payload, i.e. the time slot input to the cell assembly buffer next is the first data of the SAR-PDU payload and when the SC of the SAR-PDU header becomes the predetermined value ("0", for example).

Upon receipt of such notice, the standby system AAL1 device starts STM data taking into the cell assembly buffer starting from the applicable time slot of the next STM frame and thereby has the output ATM cell of the act system AAL1 device coincide with the output ATM cell of the standby system AAL1 device. By conducting the same processing for all channels one by one, the act system AAL1 device and the standby system AAL1 device are synchronized.

As described above, this method is characterized by that the cell forming is not started until the timing when a particular time slot of the STM frame can be allocated from the first octet of the SAR-PDU payload section having the predetermined SC value ("0" for example) for the SAR-PDU header. By this method, the cell forming statuses of the act system and the standby system can be made identical without causing momentary shutdown of the STM signal and, without any loss or redundancy of data, switching between the act system and the standby system can be achieved.

The conventional dual AAL1 device as described above waits for the timing when the particular time slot of the STM frame can be allocated from the first octet of the SAR-PDU payload section having the predetermined SC ("0", for example) for the SAR-PDU header to start cell forming and it takes time to synchronize the standby system AAL1 device.

In addition, the conventional dual AAL1 device waits for the timing when the particular time slot of the STM frame can be allocated from the first octet of the SAR-PDU payload section having the predetermined SC ("0", for example) for the SAR-PDU header to start cell forming and the frame cycle where the standby system AAL1 device can be synchronized varies depending on the time slot count in one channel of the STM data.

Details of these drawbacks are described below with referring to FIGS. 16 and 17. FIGS. 16 and 17 show the SAR-PDU payload extracted and laid out for every cycle (0 to 7) of for the SAR-PDU header. The section surrounded by a thick line shows the data for the same frame.

Suppose that a particular time slot of the STM frame is the first time slot of the frame and the first time slot of the frame is allocated from the first octet of the SAR-PDU payload having "0" for the SC of the SAR-PDU header. The frame cycle enabling allocation of the first time slot of the frame to the first octet of the SAR-PDU payload in the ATM cell having "0" as the SC is represented by "the least common multiple for the octet count of the SAR-PDU payload in one cycle of SC and the time slot count in one channel within one frame of the STM data divided by the time slot count in one channel within one frame of the STM data".

In other words, different time slot counts in one channel within one frame of the STM data result in different frame cycles to enable allocating the first time slot of the frame to the first octet of the SAR-PDU payload in the ATM cell having "0" as the SC.

FIG. 16 shows the allocation to the ATM cell when the time slot count in one channel within one frame of the STM data is 470 (data for ten SAR-PDU payloads). Since the octet count in the SAR-PDU payload for one SC cycle is 376 octets and the time slot count in one frame of the STM data is 470, the least common multiple for them is 1880. When 1880 is divided by 470, the time slot count in one channel within one frame of the STM data, the quotient is 4.

Specifically, as shown in FIG. 16, the frame cycle in which the first time slot of a frame can be allocated to the first octet of the SAR-PDU payload of the ATM cell having "0" as SC is 4.

FIG. 17 shows the allocation to the ATM cell when the time slot count in one channel within one frame of the STM data is 423 (data for nine SAR-PDU payloads). Since the octet count in the SAR-PDU payload for one SC cycle is 376 octets and the time slot count in one frame of the STM data is 423, the least common multiple for them is 3384. When 3384 is divided by 423, the time slot count in one frame of the STM data, the quotient is 8.

Specifically, as shown in FIG. 17, the frame cycle in which the first time slot of a frame can be allocated to the first octet of the SAR-PDU payload of the ATM cell having "0" for is 8.

As described above, depending on the time slot count in one channel within one frame of the STM data, the frame cycle in which a particular time slot of a frame can be allocated from the first octet of the SAR-PDU payload section having the predetermined SC ("0", for example) for the SAR-PDU header varies. Thus, depending on the time slot count in one channel within one frame of the STM data, the frame cycle in which a particular time slot of a frame can be allocated from the first octet of the SAR-PDU payload section having the predetermined SC ("0", for example) for the SAR-PDU header may have several hundreds of frames. It takes time to synchronize the standby system AAL1 device.

SUMMARY OF THE INVENTION

An object of the present invention is to provide a dual AAL1 device and a synchronized method to be used therewith which can eliminate the above drawbacks, reduce the time needed by synchronization for system switching without any loss or redundancy of data and make the time required for synchronization constant regardless of the time slot count in one channel within one frame of STM data.

According to the first aspect of the invention, a dual AAL1 (ATM Adaptation Layer Type 1) device with a dual configuration consisting of an act system and a standby system to convert the STM (Synchronous Transfer Mode) data into ATM (Asynchronous Transfer Mode) cells in the act system and the standby system respectively comprising, for the act system and the standby system respectively, means for extracting the SC (Sequence Count) information of the ATM cell where a particular time slot of the STM data is allocated and the allocation position information for the SAR-PDU (Segmentation And Reassembly-Protocol Data Unit) payload when this means belong to the act system, and means for calculating the SC of the ATM cell where a particular time slot of the STM data in the next frame is allocated and the allocation position for the SAR-PDU payload based on the SC information and the allocation position information extracted by the act system when this means belongs to the standby system.

In the preferred construction, the act system extracts the SC information of the ATM cell to which a particular time slot of the STM data in the applicable frame is allocated and the allocation position information for the SAR-PDU payload upon receipt of a synchronization request and notifies such information to the standby system, and the standby system uses the SC information and the allocation position information from the act system to calculate the SC of the ATM cell to which a particular time slot of the STM data in the next frame is allocated and the allocation position for the SAR-PDU payload and then allocates the particular time slot of the STM data in the next frame to that position.

According to the second aspect of the invention, a dual AAL1 device with a dual configuration consisting of an act system and a standby system to convert the STM data into ATM cells in the act system and the standby system respectively comprising, for the act system and the standby system respectively, means for extracting the SC information of the ATM cell to which the pointer is inserted and the pointer value information when this means belongs to the act system, and means for calculating the SC of the ATM cell to which a particular time slot of the STM data in the next frame is allocated and the allocation position for the SAR-PDU payload based on the SC information and the pointer value information extracted by the act system when this means belongs to the standby system.

In the preferred construction, the act system extracts the SC information of the ATM cell to which the pointer is inserted and the pointer value information upon receipt of a synchronization request and notifies the information to the standby system, and the standby system calculates the SC of the ATM cell to which a particular time slot of the STM data in the next frame is allocated and the allocation position for the SAR-PDU payload based on the SC information of the ATM cell to which the pointer is inserted and the pointer value information from the act system and allocates the particular time slot of the STM data in the next frame at that position.

According to the third aspect of the invention, a dual AAL1 device with a dual configuration consisting of an act system and a standby system to convert the STM data into ATM cells in the act system and the standby system respectively comprising, for the act system and the standby system respectively, means for extracting the SC information of the ATM cell to which a particular time slot of the STM data is allocated and the allocation position information for the SAR-PDU payload, and means for calculating the SC of the ATM cell to which a particular time slot of the STM data in the next frame is allocated and the allocation position for the SAR-PDU payload based on the extracted SC information and the allocation position information, the SC of the ATM cell and the allocation position for the SAR-PDU payload are calculated and notified to the standby system when this means belongs to the act system.

In the preferred construction, the act system extracts the SC information of the ATM cell to which a particular time slot of the STM data in the applicable frame is allocated and the allocation position information for the SAR-PDU payload upon receipt of a synchronization request, calculates the SC of the ATM cell to which a particular time slot of the STM data in the next frame is allocated and the allocation position for the SAR-PDU payload and notifies the calculation results to the standby system, and the standby system allocates the particular time slot of the STM data in the next frame to the allocation position obtained from the act system.

According to another aspect of the invention, a dual AAL1 device with a dual configuration consisting of an act system and a standby system to convert the STM data into ATM cells in the act system and the standby system respectively comprising, for the act system and the standby system respectively, means for extracting the SC information of the ATM cell to which the pointer is inserted and the pointer value information, and means for calculating the SC of the ATM cell to which a particular time slot of the STM data in the next frame is allocated and the allocation position for the SAR-PDU payload based on the extracted SC information and pointer value information and, in case of the act system, the SC of the ATM cell and the allocation position of the SAR-PDU payload being calculated and notified to the standby system.

In the preferred construction, the act system extracts the SC information of the ATM cell to which the pointer is inserted and the pointer value information upon receipt of a synchronization request, calculates the SC of the ATM cell to which a particular time slot of the STM data in the next frame is allocated and the allocation position for the SAR-PDU payload and notifies the calculation results to the standby system and the standby system allocates the particular time slot of the STM data in the next frame to the allocation position obtained from the act system.

According to another aspect of the invention, a synchronization method for a dual AAL1 device with a dual configuration consisting of an act system and a standby system to convert the STM data into ATM cells in the act system and the standby system respectively comprising:

a step for the act system to extract the SC of the ATM cell to which a particular time slot of the STM data in the applicable frame is allocated and the allocation position information for the SAR-PDU payload upon receipt of a synchronization request and to notify the information to the standby system, and a step for the standby system to calculate the SC of the ATM cell in which a particular time slot of the STM data in the next frame is allocated and the allocation position for the SAR-PDU payload based on the SC information and the allocation position information from the act system and to allocate the particular time slot of the STM data in the next frame at that position.

According to another aspect of the invention, a synchronization method for a dual AAL1 device with a dual configuration consisting of an act system and a standby system to convert the STM data into ATM cells in the act system and the standby system respectively comprising:

a step for the act system extracting the SC information of the ATM cell to which the pointer is inserted and the pointer value information upon receipt of a synchronization request and notifying the information to the standby system, and a step for the standby system calculating the SC of the ATM cell to which a particular time slot of the STM data in the next frame is allocated and the allocation position for the SAR-PDU payload based on the SC information of the ATM cell to which the pointer is inserted and the pointer value information from the act system and allocating the particular time slot of the STM data in the next frame to that position.

According to another aspect of the invention, a synchronization method for a dual AAL1 device with a dual configuration consisting of an act system and a standby system to convert the STM data into ATM cells in the act system and the standby system respectively comprising:

a step for the act system extracting the SC information of the ATM cell to which a particular time slot of the STM data in the applicable frame is allocated and the allocation position information for the SAR-PDU payload upon receipt of a synchronization request, calculating the SC of the ATM cell to which a particular time slot of the STM data in the next frame is allocated and the allocation position for the SAR-PDU payload and to notifying the calculation result to the standby system, and a step for the standby system allocating the particular time slot of the STM data in the next frame to the allocation position from the act system.

According to another aspect of the invention, a synchronization method for a dual AAL1 device with a dual configuration consisting of an act system and a standby system to convert the STM data into ATM cells in the act system and the standby system respectively comprising:

a step for the act system extracting the SC information of the ATM cell to which the pointer is inserted and the pointer value information upon receipt of a synchronization request, to calculate the SC of the ATM cell to which a particular time slot of the STM data in the next frame is allocated and the allocation position for the SAR-PDU payload and notifying the calculation result to the standby system, and a step for the standby system allocating the particular time slot of the STM data in the next frame to the allocation position from the act system.

According to a further aspect of the invention, a dual AAL1 device with a dual configuration consisting of an act system and a standby system to convert the STM data into ATM cells in the act system and the standby system respectively comprising, for the act system and the standby system respectively, a cell forming section which, when it belongs to the act system, extracts the SC information of the ATM cell where a particular time slot of the STM data is allocated and the allocation position information for the SAR-PDU payload and an operation processing section which, when it belongs to the standby system, uses the SC information and the allocation position information extracted by the act system to calculate the SC of the ATM cell where a particular time slot of the STM data in the next frame is allocated and the allocation position for the SAR-PDU payload.

In the preferred construction, the act system extracts the SC information of the ATM cell to which a particular time slot of the STM data in the applicable frame is allocated and the allocation position information for the SAR-PDU payload upon receipt of a synchronization request and notifies the information to the standby system, and the standby system uses the SC information and the allocation position information from the act system to calculate the SC of the ATM cell to which a particular time slot of the STM data in the next frame is allocated and the allocation position for the SAR-PDU payload and allocates the particular time slot of the STM data in the next frame to that position.

According to a further aspect of the invention, a dual AAL1 device with a dual configuration consisting of an act system and a standby system to convert the STM data into ATM cells in the act system and the standby system respectively comprising, for the act system and the standby system respectively, a cell forming section which, when it belongs to the act system, extracts the SC information of the ATM cell where the pointer is inserted and the pointer value information, and an operation processing section which, when it belongs to the standby system, uses the SC information and the pointer value information extracted by the act system to calculate the of the ATM cell where particular time slot of the STM data in the next frame is allocated and the allocation position for the SAR-PDU payload.

In the preferred construction, the act system extracts the SC information of the ATM cell to which the pointer is inserted and the pointer value information upon receipt of a synchronization request and notifies the information to the standby system and the standby system uses the SC information of the ATM cell to which the pointer is inserted and the pointer value information obtained from the act system to calculate the SC of the ATM cell to which a particular time slot of the STM data in the next frame is allocated and the allocation position for the SAR-PDU payload and allocates the particular time slot of the STM data in the next frame to that position.

According to a still further aspect of the invention, a dual AAL1 device with a dual configuration consisting of an act system and a standby system to convert the STM data into ATM cells in the act system and the standby system respectively comprising, for the act system and the standby system respectively, a cell forming section which extracts the SC information of the ATM cell where a particular time slot of the STM data is allocated and the allocation position information for the SAR-PDU payload and an operation processing section which uses the extracted SC information and the allocation position information to calculate the SC of the ATM cell where a particular time slot of the STM data in the next frame is allocated and the allocation position for the SAR-PDU payload and, in case of the act system, the SC of the ATM cell and the allocation position for the SAR-PDU payload being calculated and notified to the standby system.

In the preferred construction, the act system extracts the SC information of the ATM cell to which a particular time slot of the STM data in the applicable frame is allocated and the allocation position information for the SAR-PDU payload upon receipt of a synchronization request and calculates the SC of the ATM cell to which a particular time slot of the STM data in the next frame is allocated and the allocation position for the SAR-PDU payload and notifies the calculation results to the standby system and the standby system allocates the particular time slot of the STM data in the next frame to the allocation position obtained from the act system.

According to a still further aspect of the invention, a dual AAL1 device with a dual configuration consisting of an act system and a standby system to convert the STM data into ATM cells in the act system and the standby system respectively comprising, in the act system and the standby system respectively, a cell forming section which extracts the SC information of the ATM cell where the pointer is inserted and the pointer value information an operation processing section which uses the extracted SC information and the pointer value information to calculate the SC of the ATM cell where a particular time slot of the STM data in the next frame is allocated and the allocation position for the SAR-PDU payload and, in case of the act system, the SC of the ATM cell and the allocation position for the SAR-PDU payload being calculated and notified to the standby system.

In the preferred construction, the act system extracts the SC information of the ATM cell to which the pointer is inserted and the pointer value information upon receipt of a synchronization request and calculates the SC of the ATM cell to which a particular time slot of the STM data in the next frame is allocated and the allocation position for the SAR-PDU payload and notifies the calculation results to the standby system, and the standby system allocates the particular time slot of the STM data in the next frame to the allocation position obtained from the act system.

Specifically, a dual AAL1 device according to the present invention comprises means to extract the SC information of the ATM cell to which a particular time slot of the STM data is allocated and the allocation position information for the SAR-PDU payload (the SC information and the allocation position information for the SAR-PDU payload are hereinafter referred to as the synchronization information), means to send or receive the extracted synchronization information between both systems of AAL1 devices, and means to calculate the SC of the cell to which the applicable time slot of the next STM data is allocated and the allocation position for the SAR-PDU payload based on the received synchronization information.

In addition, for the dual AAL1 device according to the present invention, the SC information of the cell to which the pointer is inserted and the pointer value information can be also used as the synchronization information in case the protocol of the structured data transfer is applied.

In the dual AAL1 device according to the present invention, the SC information of the ATM cell to which a particular time slot of the STM data is allocated and the allocation position information for the SAR-PDU payload or, in case the protocol of the structured data transfer is applied, the SC information of the ATM cell to which the pointer is inserted and the pointer value information are used for calculation of the SC of the cell to which the applicable time slot of the next STM data is allocated and the allocation position for the SAR-PDU payload.

Thus, it is not necessary to wait for the timing when the particular time slot of an STM frame is allocated from the first octet of the SAR-PDU payload section having the SC with the predetermined SAR-PDU header ("0", for example). In addition, it becomes possible to make the time required for synchronization constant regardless of the time slot count in a channel within one frame of the STM data.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
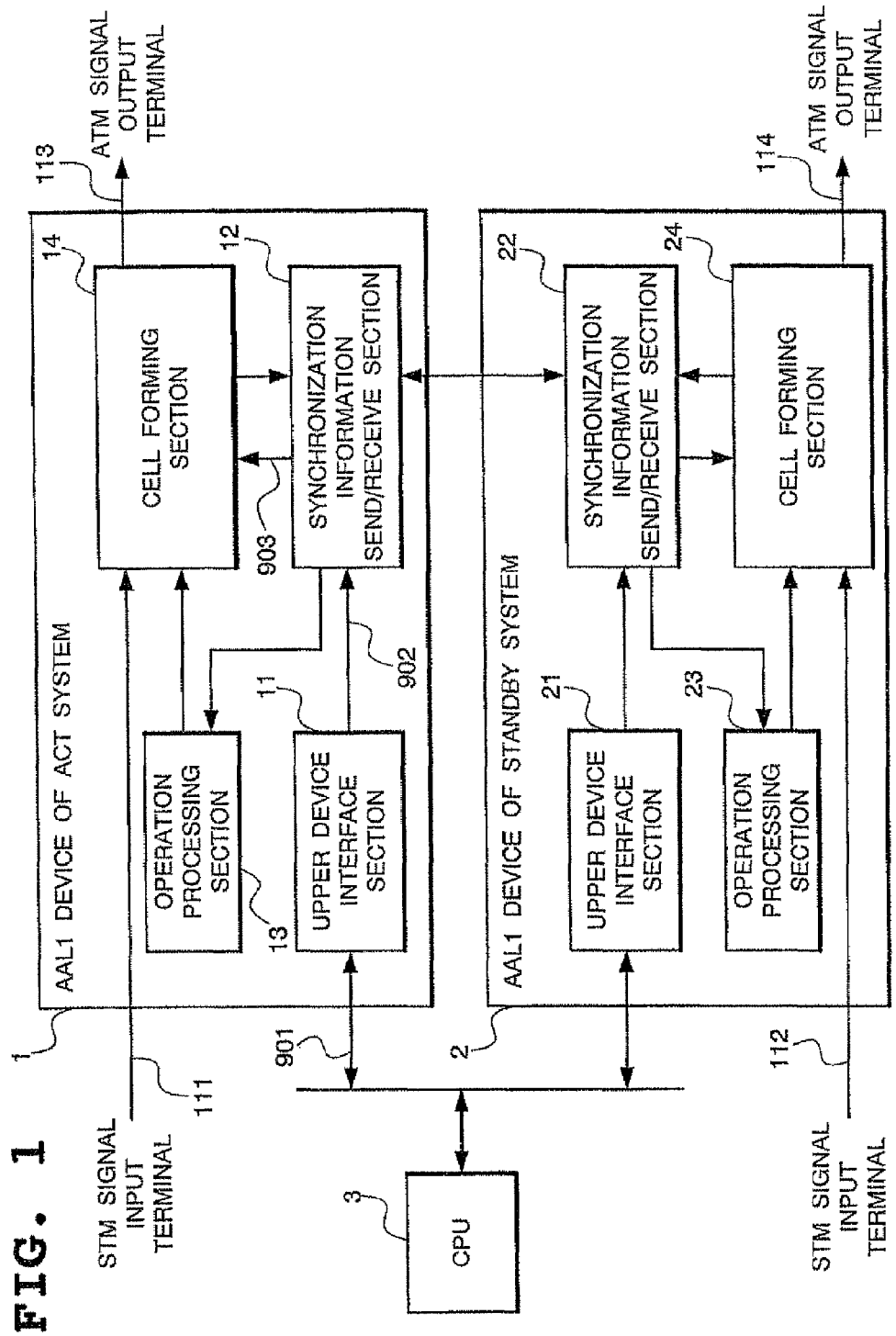
FIG. 1 is a block diagram showing the configuration of a dual AAL1 device according to an embodiment of the present invention.

FIG. 1 is a block diagram showing the configuration of a dual AAL1 device according to an embodiment of the present invention. In FIG. 1, a dual AAL1 device according to an embodiment of the present invention has a dual configuration comprising an act system AAL1 device 1 and a standby system AAL1 device 2. Each of the act system AAL1 device 1 and the standby system AAL1 device 2 respectively has the same circuit configuration with an AAL1 processing function to convert the STM format signal into the ATM format signal.

Each of the act system AAL1 device 1 and the standby system AAL1 device 2 is connected to a CPU 3 and comprises an upper device interface section 11 or 21, a synchronization information send/receive section 12 or 22, an operation processing section 13 or 23 and a cell forming section 14 or 24 as well as an STM signal input terminal 111 or 112 and an ATM signal output terminal 113 or 114.

The upper device interface section 11/21 transfers the instruction from the CPU 3 to the functional blocks in the same device. The cell forming section 14/24 converts the STM data into ATM cells. The synchronization information send/receive section 12/22 extracts the synchronization information from the cell forming section 14/24 according to the instruction from the upper device interface section 11/21 and sends or receives the synchronization information to or from the other system.

The operation processing section 13/23 calculates, based on the synchronization information sent from the synchronization information send/receive section 12/22, the SC of the cell to which the applicable time slot of the next STM data is allocated and the allocation position for the SAR-PDU payload. The STM signal input terminal 111/112 receives input of the STM signal (Data signal, frame signal and clock signal) and the ATM signal output terminal 113/114 outputs the ATM signal (Data signal, frame signal and clock signal).

Figure 2:
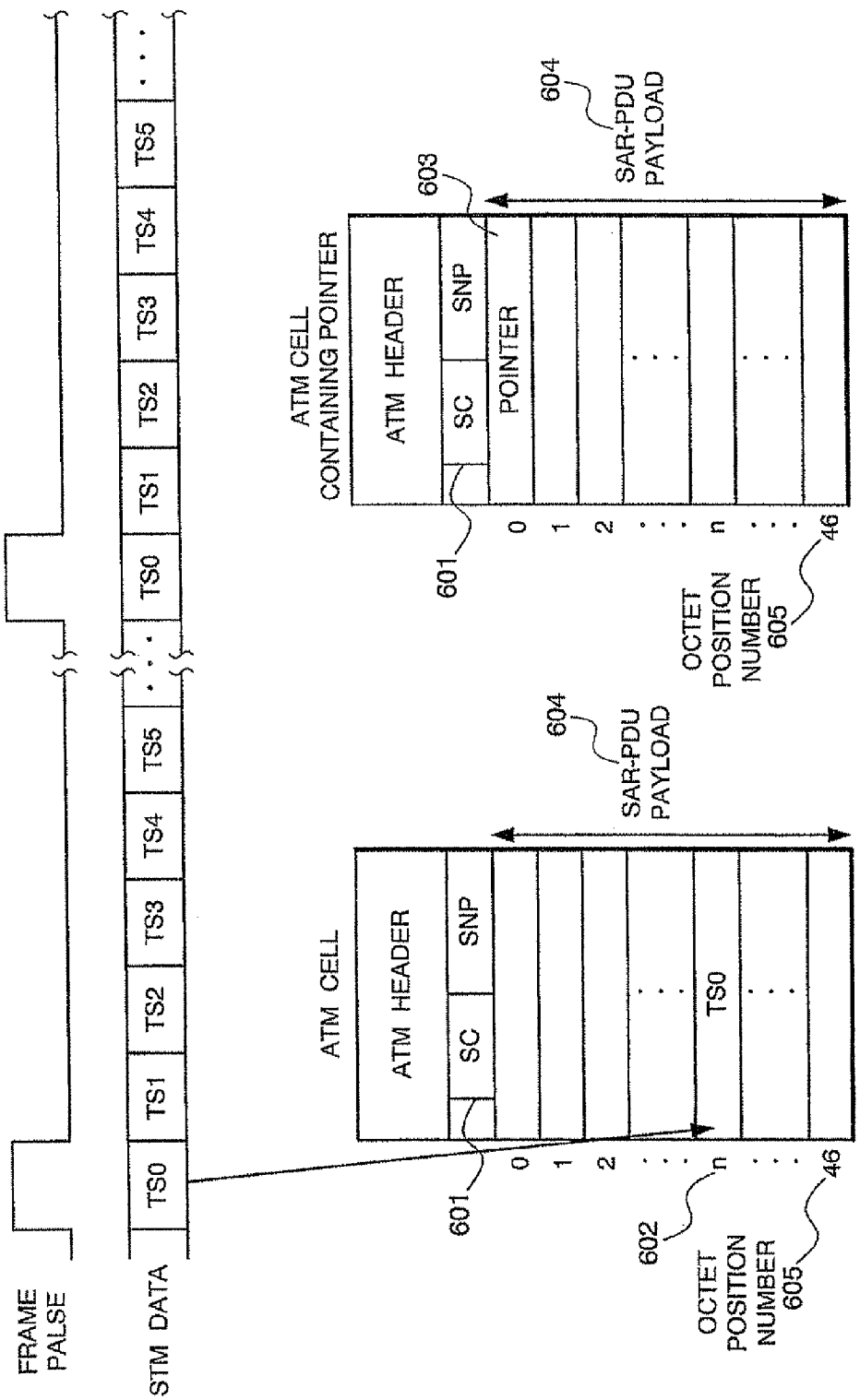
FIG. 2 is a diagram to show the definition of the synchronization information according to an embodiment of the present invention.

FIG. 2 is a diagram showing the definition of the synchronization information according to an embodiment of the present invention. In FIG. 2, the synchronization information comprises SC information 601 of the ATM cell to which a particular time slot of the STM data is allocated and allocation position information 602 for the SAR-PDU payload 604. In case the protocol for the structured data transfer is used, the SC information 601 of the cell to which the pointer is inserted and its pointer value information 603 can be treated as the synchronization information.

Next, the definition of the allocation position information 602 for the SAR-PDU payload 604 is described. Suppose that "0" is allocated to the first octet position of the SAR-PDU payload 604, "1" to the subsequent octet and so on so that a octet position number 605 is allocated to a octet position in the SAR-PDU payload 604. The octet position number 605 of the position to which a particular time slot of the STM data is allocated is defined as the allocation position information 602 for the SAR-PDU payload 604.

Figure 3:
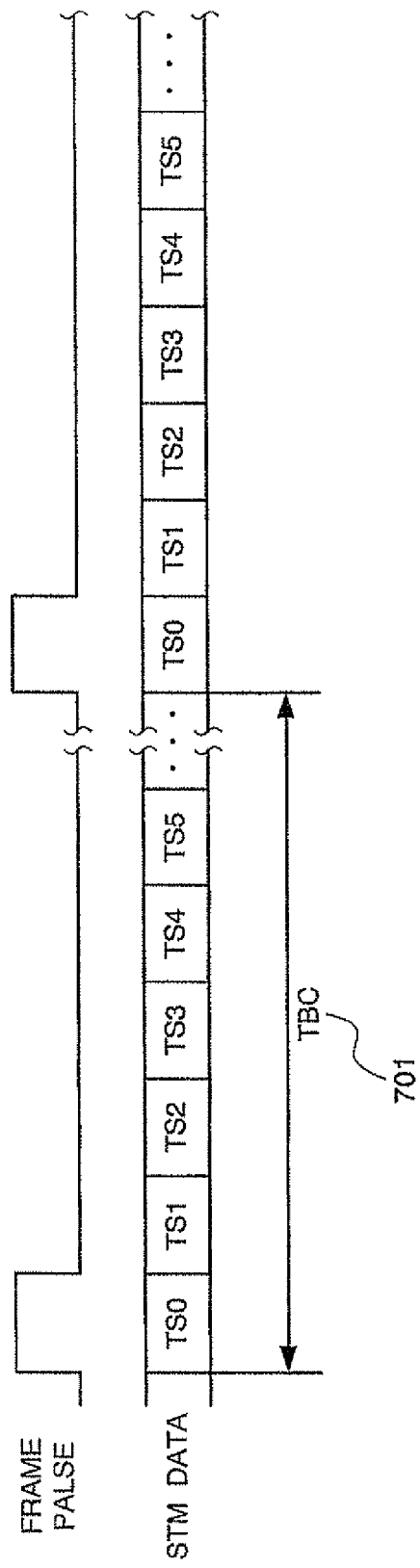
FIG. 3 is a diagram showing the configuration of the STM data to illustrate the octet count in one channel within one frame according to an embodiment of the present invention.

FIG. 3 is a diagram showing the STM data structure to illustrate the octet count in one channel within one frame according to an embodiment of the present invention. FIG. 3 shows the elements of the STM data required for the operation processing section 13/23.

According to an embodiment of the present invention, the time slot count (hereinafter referred to as TBC) 701 in one channel within one frame is required for the operation processing section 13/23. When all time slots in one frame are treated as one channel, the TBC 701 becomes equal to the total number of time slots.

Figure 4:
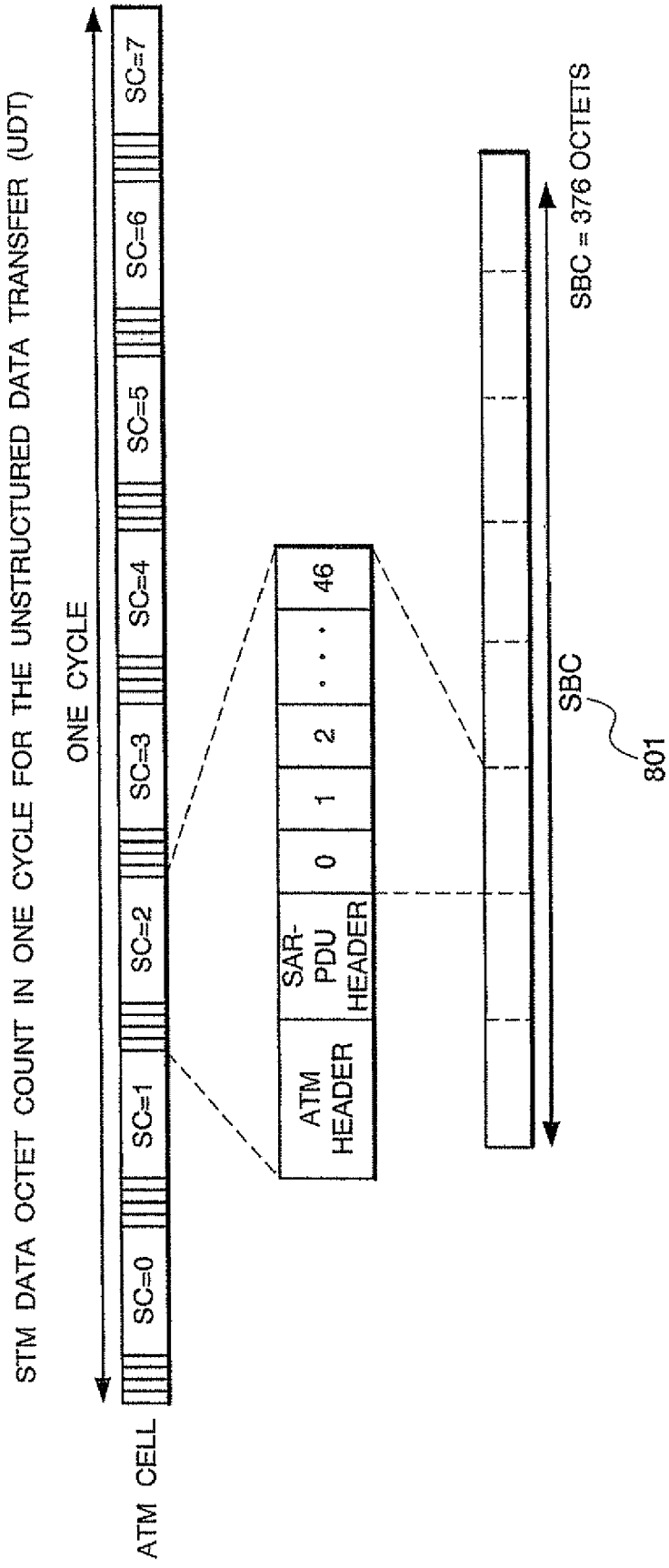
FIG. 4 is a diagram to show the STM data octet count in one cycle during the unstructured data transfer according to an embodiment of the present invention.
Figure 5:
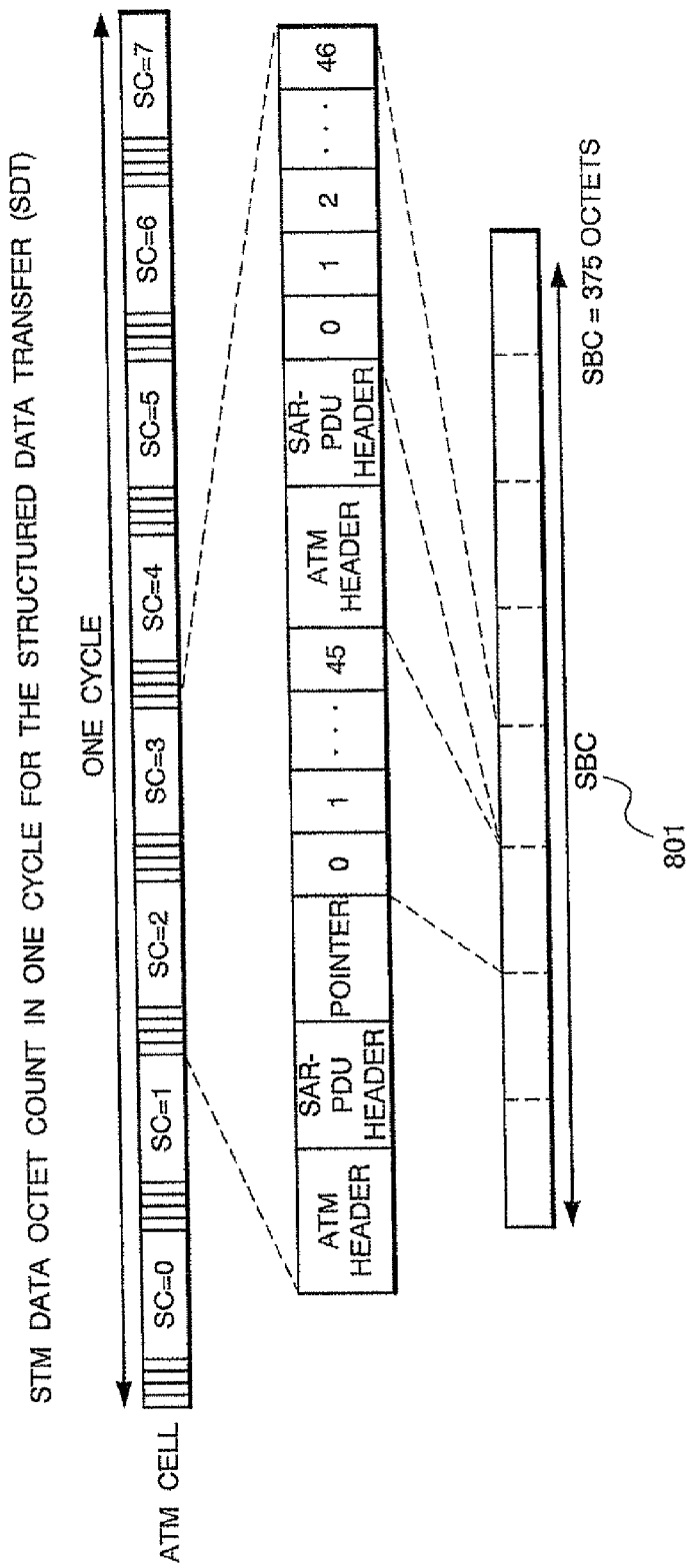
FIG. 5 is a diagram to show the STM data octet count in one cycle during the structured data transfer according to an embodiment of the present invention.

FIGS. 4 and 5 are diagrams to illustrate the STM data octet count within one cycle of ATM cells according to an embodiment of the present invention. FIG. 4 shows the STM data octet count within one cycle for the unstructured data transfer (UDT) and FIG. 5 shows the STM data octet count within one cycle for the structured data transfer (SDT). FIGS. 4 and 5 show the elements of the ATM cells required for the operation processing section 13/23. The AAL1 has a structure in which eight ATM cells form one cycle.

In the unstructured data transfer, the SAR-PDU payload is fixed to 47 octets for all ATM cells. The STM data octet count in one cycle of ATM cells is 376 (=8.times.47) octets.

In the structured data transfer, an ATM cell containing a pointer is always inserted to one cycle of ATM cells. The STM data octet count in one cycle of ATM cells is always 375 (=7.times.47+46) octets.

According to an embodiment of the present invention, the STM data octet count (hereinafter referred to as the SBC) 801 for one ATM cycle is required for the operation processing section 13/23. Therefore, the SBC 801 becomes 376 for the unstructured data transfer and the SBC 801 becomes 375 for the structured data transfer.

Figure 6:
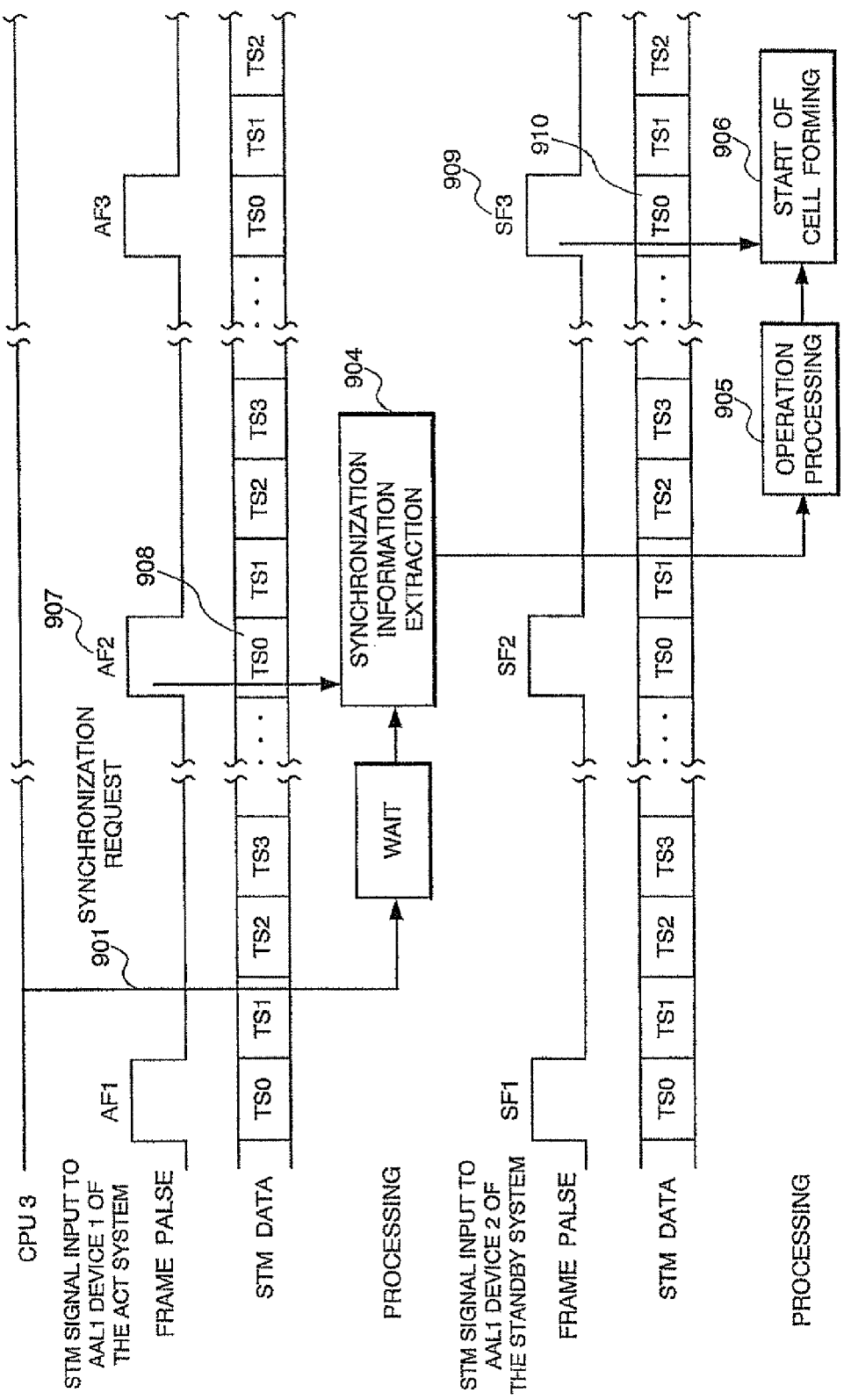
FIG. 6 is a diagram showing the synchronization processing for a dual AAL1 device according to an embodiment of the present invention.
Figure 7:
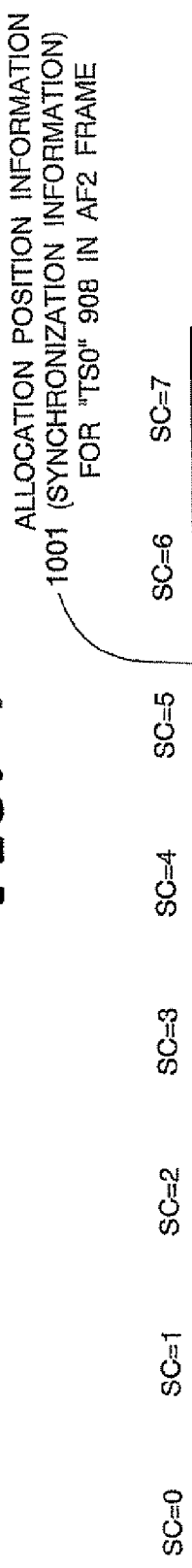
FIG. 7 is a diagram showing the structure where the STM data allocated to the ATM cells are extracted and connected for every cycle of ATM cells according to an embodiment of the present invention.

FIG. 6 is a diagram showing the synchronization processing for a dual AAL1 device according to an embodiment of the present invention and FIG. 7 is a diagram showing the structure where the STM data allocated to ATM cells are extracted and connected for every cycle of ATM cells according to an embodiment of the present invention. With referring to FIGS. 1 to 7, a synchronization method used for cell forming processing according to an embodiment of the present invention will be described.

Described below is the synchronization method for cell forming processing when all time slots of the STM data are treated as one channel and the SC information 601 of the cell to which the first time slot of the frame is allocated and the allocation position information 602 for the SAR-PDU payload are treated as the synchronization information.

When a synchronization request 901 is input from the CPU 3 to the upper interface section 11 of the act system AAL1 device 1, the upper interface section 11 gives a synchronization instruction 902 to the synchronization information send/receive section 12. Upon receipt of the synchronization instruction 902, the synchronization information send/receive section 12 gives a synchronization information extraction instruction 903 to the cell forming section 14. Upon receipt of the synchronization information extraction instruction 903, the cell forming section 14 waits for input of the next frame pulse ("AF2" 907 in FIG. 6).

Upon receipt of the next frame pulse ("AF2" 907 in FIG. 6), the cell forming section 14 extracts the SC information 601 of the cell to which the first octet "TS0" 908 of the "AF2" frame is allocated and the allocation position information 602 for the SAR-PDU payload (Synchronization information extraction 904).

The synchronization information is transferred to the synchronization information send/receive section 22 of the standby system AAL1 device 2 via the synchronization information send/receive section 12. Upon receipt of the synchronization information, the synchronization information send/receive section 22 of the standby system AAL1 device 2 transfers the synchronization information to the operation processing section 23.

The operation method at the operation processing section 23 (Operation processing 905) will be described with referring to FIG. 7. In FIG. 7, the section surrounded by a thick line represents the AF2 frame. The shaded part shows a position 1001 to which the first time slot "TS0" 908 of the AF2 frame is allocated and the horizontal line section shows a position 1002 to which the first time slot "TS0" 910 of the SF3 frame is allocated and RBC 1003 shows the time slot count in the AF2 frame within the cycle (n+3). Based on the synchronization information and the elements TBC 701 and SBC 801, the RBC 1003 can be expressed by the formula below:

$$RBC = \text{MOD}([TBC - \{(7-SC) \times 47 + (n+1)\}]/SBC)$$

where MOD([TBC−{(7−SC)×47+(n+1)}]/SBC)

represents the "remainder when [TBC−{(7−SC)×47+(n+1)}] is divided by SBC", SC represents the SC information 601 of the synchronization information and n represents the allocation position information 602 for the SAR-PDU payload.

Based on this RBC 1003, the SC of the ATM cell to which the first time slot "TS0" 910 of the SF3 frame is allocated and the allocation position for the SAR-PDU payload in the unstructured data transfer can be expressed as follows:

$$SC = \text{MOD}(\text{QUTIENT}(RBC/47)/8); \text{ and}$$

$$\text{Allocation position for the } SAR\text{-}PDU \text{ payload} = \text{MOD}(RBC/47)$$

where QUTIENT (RBC/47) show the "integer section of the quotient when RBC is divided by 47".

In case of the structured data transfer, the SC of the ATM cell to which the first time slot "TS0" 910 of the SF3 frame is allocated and the allocation position for the SAR-PDU payload can be expressed as follows:

$$SC = \text{MOD}(\text{QUTIENT}((RBC/47) + 1/8); \text{ and}$$

$$\text{Allocation position for the } SAR\text{-}PDU \text{ payload} = \text{MOD}(RBC/47) + 1$$

Then, the SC of the ATM cell to which the first time slot "TS0" 910 of the SF3 frame is allocated and the allocation position for the SAR-PDU payload as the operation processing results of the operation processing section 23 are transferred to the cell forming section 24. Upon receipt of the SF3 frame pulse 909, the cell device section 24 allocates the STM data from the first time slot "TS0" 910 of the "SF3" frame starting from the allocation position for the SAR-PDU payload of the ATM cell having the SC obtained as the result of the above operation processing (Start of cell forming 906) and thereby synchronizes the act system AAL1 device and the standby system AAL1 device 2.

Figure 8:
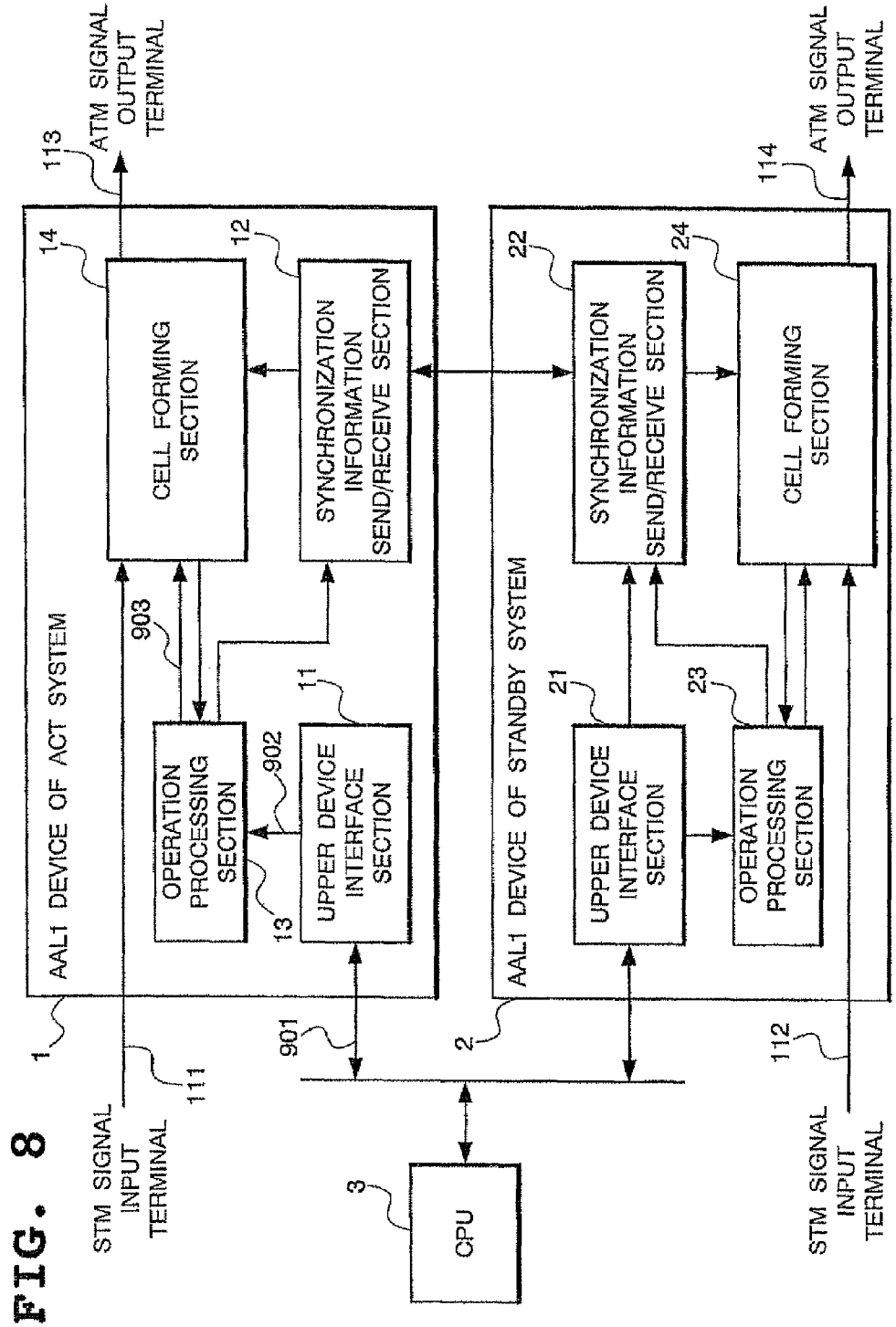
FIG. 8 is a block diagram showing the configuration of a dual AAL1 device according to another embodiment of the present invention.

FIG. 8 is a block diagram showing the configuration of a dual AAL1 device according to another embodiment of the present invention. In FIG. 8, the dual AAL1 device according to another embodiment of the present invention has the same configuration as the dual AAL1 device according to the first embodiment of the present invention shown in FIG. 1 except that the synchronization instruction 902 is input to the operation processing section 13 and the synchronization information extraction instruction 903 is output from the operation processing section 13 and input to the cell forming device 14. The same configuration elements are provided with the same reference numbers.

Figure 9:
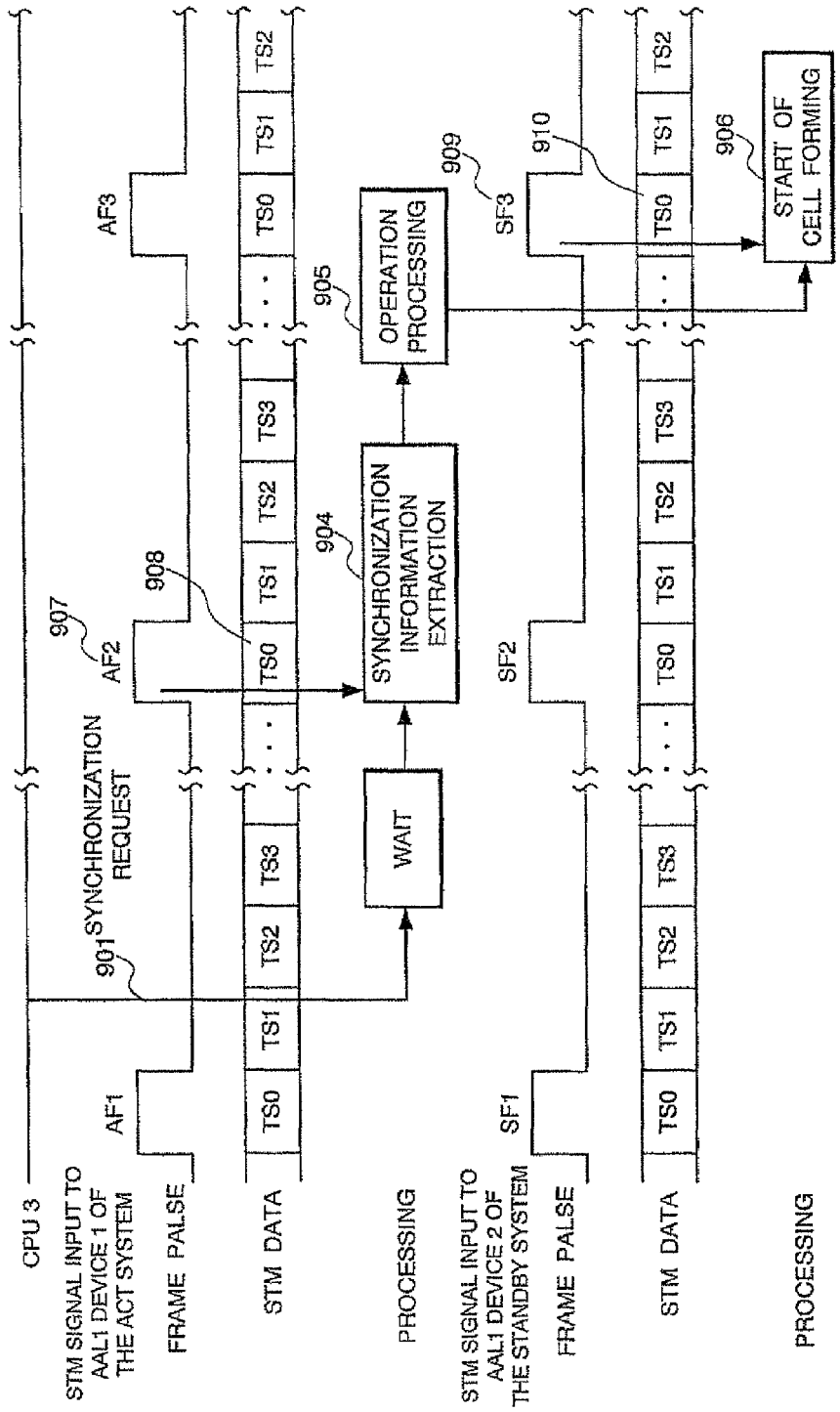
FIG. 9 is a diagram showing the synchronization processing for a dual AAL1 device according to another embodiment of the present invention.
Figure 10:
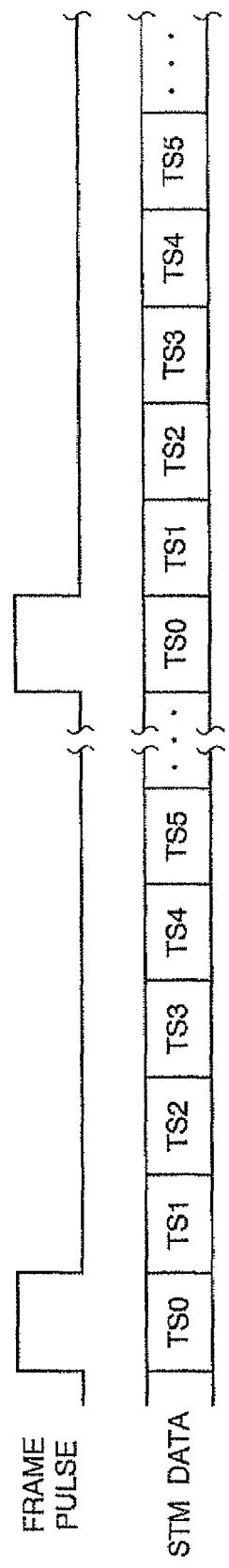
FIG. 10 is a diagram showing the conventional STM data structure.
Figure 11:
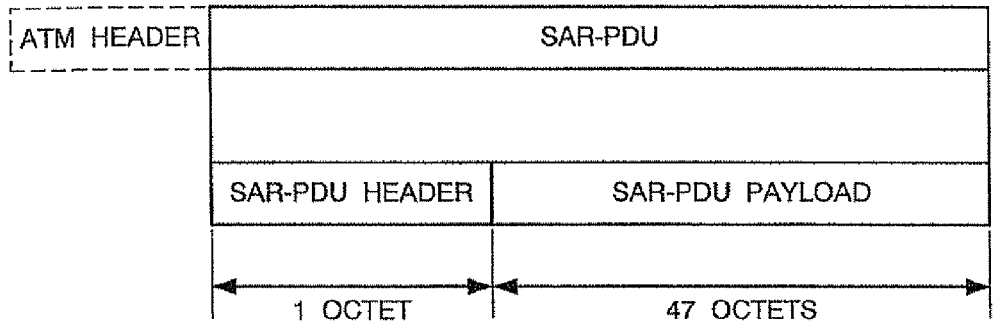
FIG. 11 is a diagram showing the structure of a conventional SAR sublayer.
Figure 12:
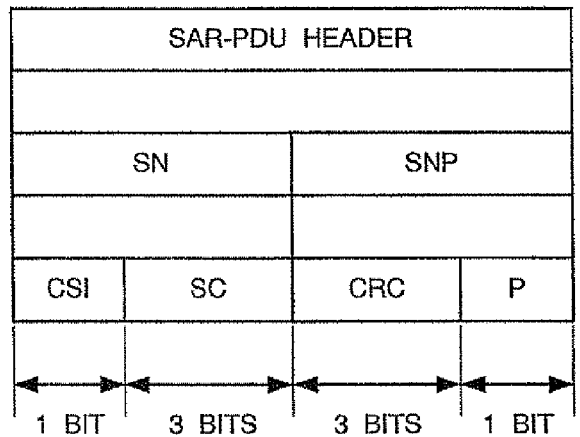
FIG. 12 is a diagram showing the structure of a conventional SAR-PDU header.
Figure 13:
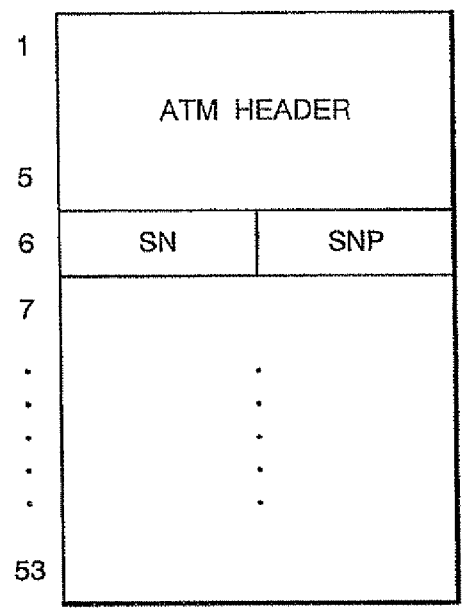
FIG. 13 is a diagram showing the structure of a conventional non-P format.
Figure 14:
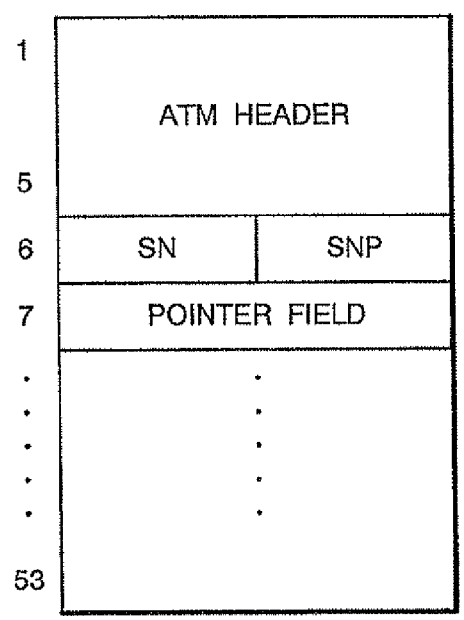
FIG. 14 is a diagram showing the structure of a conventional P format.
Figure 15:
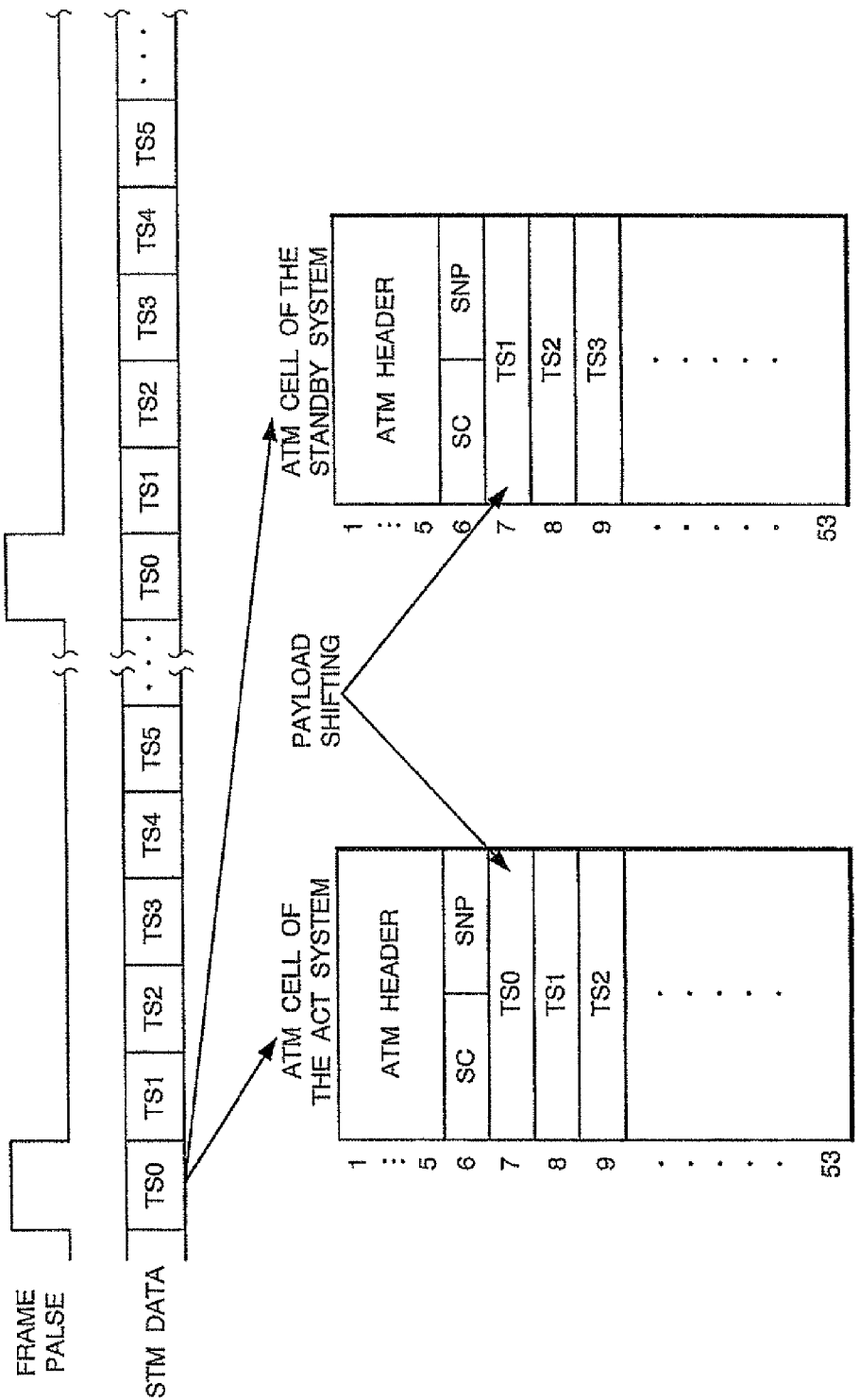
FIG. 15 is a diagram showing drawbacks of a conventional dual AAL1 device without synchronization.
Figure 16:
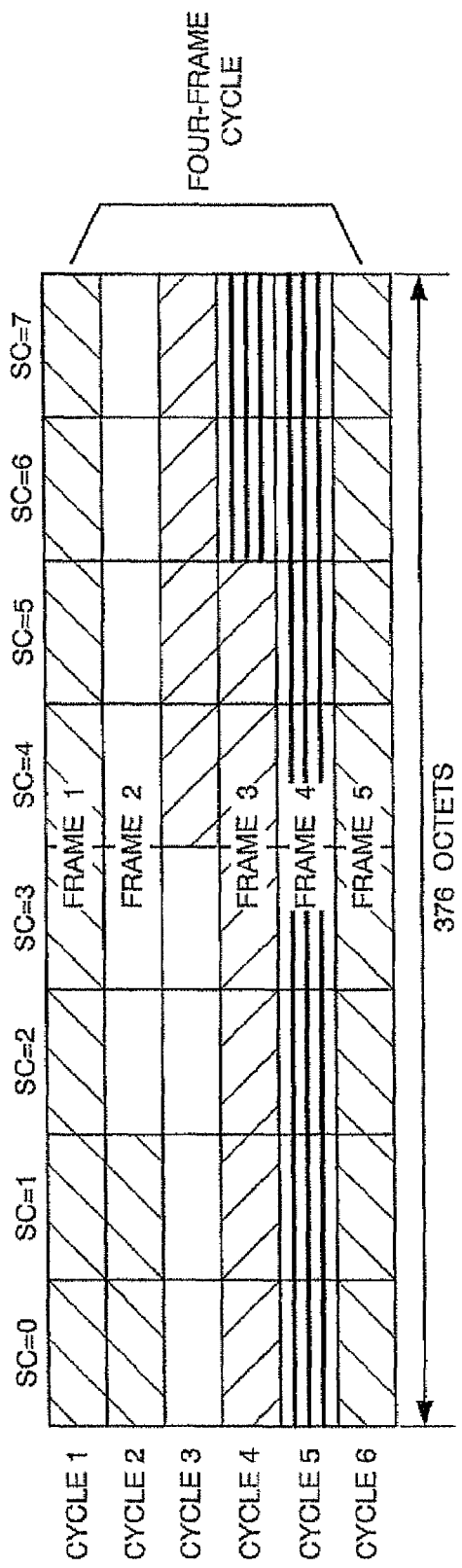
FIG. 16 is a diagram showing the conventional allocation to the ATM cells when the time slot count in one frame of STM data is 470.
Figure 17:
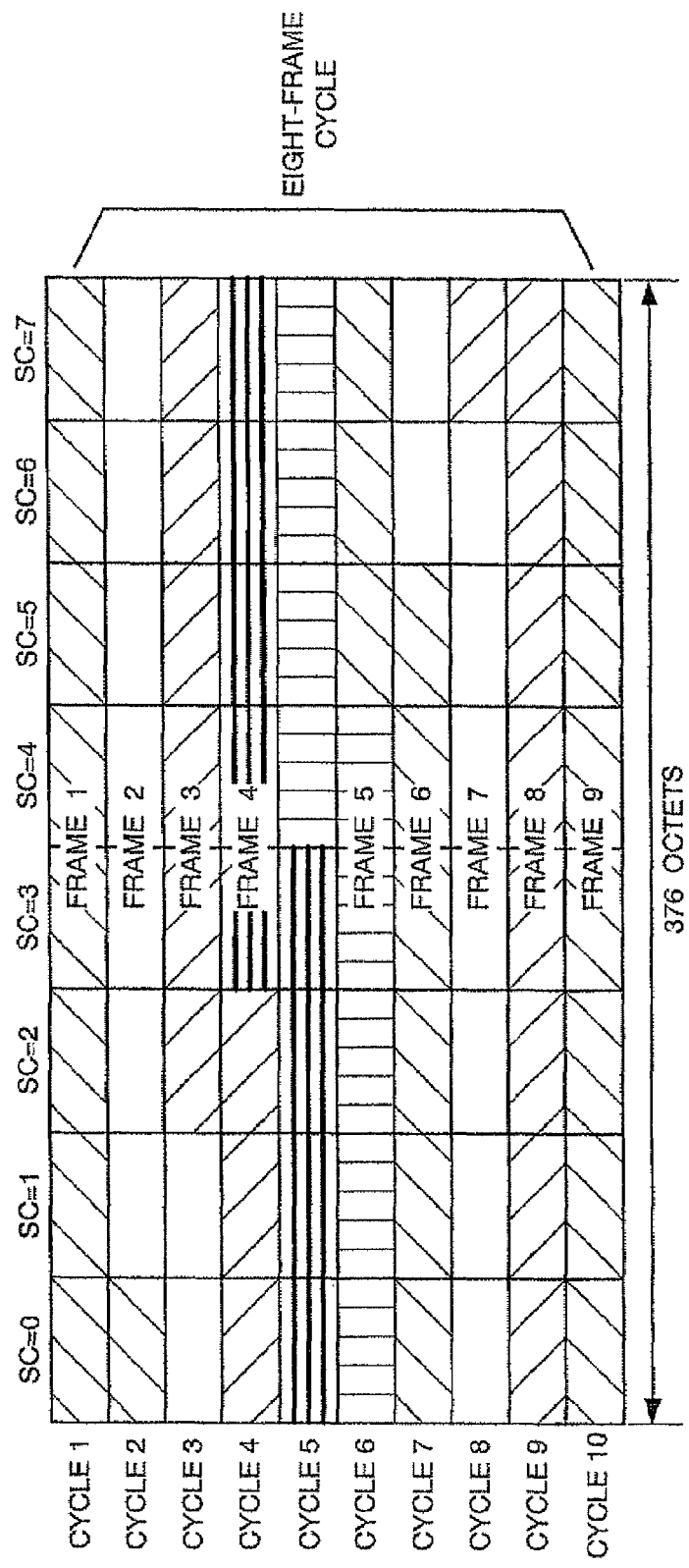
FIG. 17 is a diagram showing the conventional allocation to the ATM cells when the time slot count in one frame of STM data is 423.

FIG. 9 shows the synchronization processing of the dual AAL1 device according to another embodiment of the present invention. With referring to FIGS. 8 and 9, a synchronization method in the cell forming according to another embodiment of the present invention will be described.

Described below is the synchronization method in the cell forming when all time slots of the STM data are processed as one channel and the SC information 601 of the cell to which the first time slot of the frame is allocated and the allocation position information 602 for the SAR-PDU payload are used as the synchronization information.

When a synchronization request 901 from the CPU 3 is input to the upper device interface section 11 of the act system AAL1 device 1, the upper device interface section 11 gives a synchronization instruction 902 to the operation processing section 13. Upon receipt of the synchronization instruction 902, the operation processing section 13 gives a synchronization information extraction instruction 903 to the cell forming section 14. Upon receipt of the synchronization information extraction instruction 903, the cell forming section 14 waits for input of the next frame pulse ("AF2" 907 in FIG. 9).

Upon receipt of the next frame pulse ("AF2" 907 in FIG. 9), the cell forming section 14 extracts the SC information 601 of the cell to which the first octet "TS0" 908 of the "AF2" frame is allocated and the allocation position information 602 for the SAR-PDU payload (Synchronization information extraction 904).

The synchronization information is transferred to the operation processing section 13 and the operation processing section 13 operates the SC of the ATM cell to which the first time slot "TS0" 910 of the "SF3" frame is allocated and the allocation position for the SAR-PDU payload. The operation results obtained by the operation processing section 13 are the same as those in the first embodiment of the present invention and explanation about them is omitted here.

The SC of the ATM cell to which the first time slot "TS0" 910 of the "SF3" frame is allocated and the allocation position for the SAR-PDU payload operated by the operation processing section 13 of the act system AAL1 device 1 are transferred to the synchronization information send/receive section 22 of the standby system AAL1 device 2 via the synchronization information send/receive section 12.

The synchronization information send/receive section 22 of the standby system AAL1 device 2 transfers the received calculation results to the cell forming section 24. Upon receipt of the "SF3" frame pulse 909, the cell forming section 24 allocates the STM data from the first time slot "TS0" 910 of the "SF3" frame starting from the allocation position for the SAR-PDU payload of the ATM cell having the SC obtained as the result of above operation processing (Start of cell forming 906) and thereby synchronizes the act system AAL1 device 1 and the standby system AAL1 device 2.

When the standby system AAL1 device 2 starts the processing to convert the STM data into ATM cells upon receipt of the synchronization request by having the operation processing section 23 calculate the allocation position of a particular time slot of the next frame based on the allocation position information of a particular time slot of the current frame, it can synchronize the two frames after the receipt of the synchronization request. Thus, the time required for synchronization between the act system AAL1 device 1 and the standby system AAL1 device 2 can be reduced than that in the prior art. Further, regardless of the time slot count in one channel within one frame of the STM data, the time required for synchronization can be made constant.

Though the description above is about the case where the SC information of the ATM cell to which a particular time slot of the STM data is allocated and the allocation position information for the SAR-PDU payload are used as the synchronization information, the synchronization information may be the SC value information of the ATM cell to which the pointer is allocated and the pointer value information in case of the structured data transfer.

Further, the above description is about the case where all time slots in a frame are processed as one channel, but the present invention can be also applied to a case where one frame has several channels with time slots [64 kbps data or multiplied (64 k.times.n) data] and each channel is formed into ATM cells.

As described above, according to the present invention, a dual AAL1 device has a dual structure comprising an act system and a standby system and converts the STM data into ATM cells in each of the act system and the standby system. Upon receipt of a synchronization request, the act system extracts the SC information of the ATM cell to which a particular time slot of the STM data in the applicable frame is allocated and the allocation position information for the SAR-PDU payload and notifies the standby system of such information. The standby system calculates the SC of the ATM cell to which a particular time slot of the STM data in the next frame is allocated and the allocation position for the SAR-PDU payload based on the SC information and the allocation position information obtained from the act system so that the particular time slot of the STM data in the next frame is allocated to that position. Thus, the time required for synchronization in system switching can be reduced without any loss or redundancy of data and the time required for synchronization can be made constant regardless of the time slot count in the one channel within one STM data frame.

What is claimed is:

1. A method performed by one or more devices, comprising:
   determining, by one of the one or more devices, synchronization information from one of a plurality of first data signals associated with a data frame, where the synchronization information includes sequence count (SC) information associated with one of a plurality of second data signals to which a particular time slot of the data frame is allocated; and
   determining, by one of the one or more devices, SC information, associated with another one of the plurality of second data signals to which a particular time slot of a next data frame is allocated, and allocation position information, for a payload associated with the other one of the plurality of second data signals, based on the synchronization information.

2. The method of claim 1 where the synchronization information further includes: allocation position information for a payload associated with the one of the plurality of second data signals.

3. The method of claim 2, further comprising:
   receiving a synchronization request.

4. The method of claim 3, further comprising:
   extracting the synchronization information from the one of the plurality of first data signals in response to receiving the synchronization request.

5. The method of claim 2, where the allocation position information includes information regarding an allocation position for a segmentation and reassembly-protocol data unit (SAR-PDU) payload.

6. The method of claim 1, where the data frame includes a single channel with a plurality of time slots.

7. The method of claim 1, where the data frame includes a plurality of channels, each of the plurality of channels has a plurality of time slots.

8. The method of claim 1, where the plurality of first data signals includes a plurality of synchronous transfer mode data signals and the plurality of second data signals includes a plurality of asynchronous transfer mode data signals.

9. A system comprising:
a first system to:
  determine first synchronization information corresponding to one of a plurality of first data signals associated with a data frame, where the first synchronization information includes sequence count (SC) information, associated with one of a plurality of second data signals to which a particular time slot of the data frame is allocated, and allocation position information for a payload associated with the one of the plurality of second data signals; and
a second system to:
  determine second synchronization information, corresponding to another one of the plurality of second data signals associated with a subsequent data frame, based on the first synchronization information, and
  allocate a position in the subsequent data frame based on the second synchronization information.

10. The system of claim 9, where the second synchronization information includes SC information, associated with the other one of the plurality of second data signals to which a particular time slot of the subsequent data frame is allocated, and allocation position information for a payload associated with the other one of the plurality of second data signals.

11. The system of claim 9, where the plurality of first data signals includes a plurality of synchronous transfer mode data signals and the plurality of second data signals includes a plurality of asynchronous transfer mode data signals.

12. A system comprising:
a first system to:
  determine first synchronization information corresponding to one of a plurality of first data signals associated with a data frame, where the first synchronization information includes sequence count (SC) information, associated with one of a plurality of second data signals to which a pointer is inserted, and pointer value information associated with the pointer; and
a second system to:
  determine second synchronization information, corresponding to another one of the plurality of second data signals associated with a subsequent data frame, based on the first synchronization information, and
  allocate a position in the subsequent data frame based on the second synchronization information.

13. The system of claim 12, where the second synchronization information includes SC information, associated with the other one of the plurality of second data signals to which a particular time slot of the subsequent data frame is allocated, and allocation position information for a payload associated with the other one of the plurality of second data signals.

14. The system of claim 12, where the plurality of first data signals includes a plurality of synchronous transfer mode data signals and the plurality of second data signals includes a plurality of asynchronous transfer mode data signals.

15. A method performed by one or more devices, comprising:
  determining, by one of the one or more devices, synchronization information from one of a plurality of first data signals associated with a data frame, the synchronization information including sequence count (SC) information, associated with one of a plurality of second data signals to which a pointer is inserted and pointer value information associated with the pointer, and
  determining, by one of the one or more devices, SC information, associated with another one of the plurality of second data signals to which a particular time slot of a next data frame is allocated, and allocation position information for a payload associated with the other one of the plurality of second data signals based on the synchronization information.

16. The method of claim 15, further comprising:
receiving a synchronization request.

17. The method of claim 16, further comprising:
extracting the synchronization information from the one of the plurality of first data signals in response to receiving the synchronization request.

18. The method of claim 15, where the allocation position information includes information regarding an allocation position for a segmentation and reassembly-protocol data unit (SAR-PDU) payload.

19. The method of claim 15, where the plurality of first data signals include synchronous transfer mode data signals and the plurality of second data signals include asynchronous transfer mode data signals.

20. The method of claim 15, where the plurality of second data signals comprise cells.

* * * * *